United States Patent [19]
McNew

[11] Patent Number: 4,986,589
[45] Date of Patent: Jan. 22, 1991

[54] SECURITY FILE CABINET

[75] Inventor: Donald W. McNew, Lilburn, Ga.

[73] Assignee: Leggett & Platt, Incorporated, Carthage, Mo.

[21] Appl. No.: 397,122

[22] Filed: Aug. 22, 1989

[51] Int. Cl.⁵ .............................................. B60R 7/00
[52] U.S. Cl. .................................. 296/37.8; 224/275; 297/194; 296/37.14
[58] Field of Search ........................... 296/37.8, 37.14; 224/273, 275, 42.42; 297/411, 417, 194

[56] References Cited

U.S. PATENT DOCUMENTS

| | | | |
|---|---|---|---|
| 3,022,107 | 2/1962 | Daniels | 296/37.8 |
| 3,177,033 | 4/1965 | Daniels | 296/37.8 |
| 3,356,409 | 12/1967 | Belsky et al. | 296/24.1 |
| 4,087,126 | 5/1978 | Wynn | 296/37.8 |
| 4,193,353 | 3/1980 | Hinton et al. | 109/50 |
| 4,423,812 | 1/1984 | Sato | 296/387 |
| 4,453,759 | 6/1984 | Kathiria | 296/37.8 |
| 4,643,280 | 2/1987 | Hensley | 190/11 |
| 4,934,750 | 6/1990 | Eichler et al. | 296/37.8 |

FOREIGN PATENT DOCUMENTS 180339 10/1983 Japan .................................. 296/37.8

Primary Examiner—Margaret A. Focarino
Assistant Examiner—Joseph D. Pape
Attorney, Agent, or Firm—Wood, Herron & Evans

[57] ABSTRACT

A security file for use in a van-style vehicle, which file includes a lid cover of a lockable lid assembly pivotally movable between open and closed positions and also slidable between a rearwardly closed position and a forwardly partially open position, which forwardly partially open position facilitates use of the lid cover as a flat writing surface for a person seated in the driver's seat of the vehicle.

16 Claims, 5 Drawing Sheets

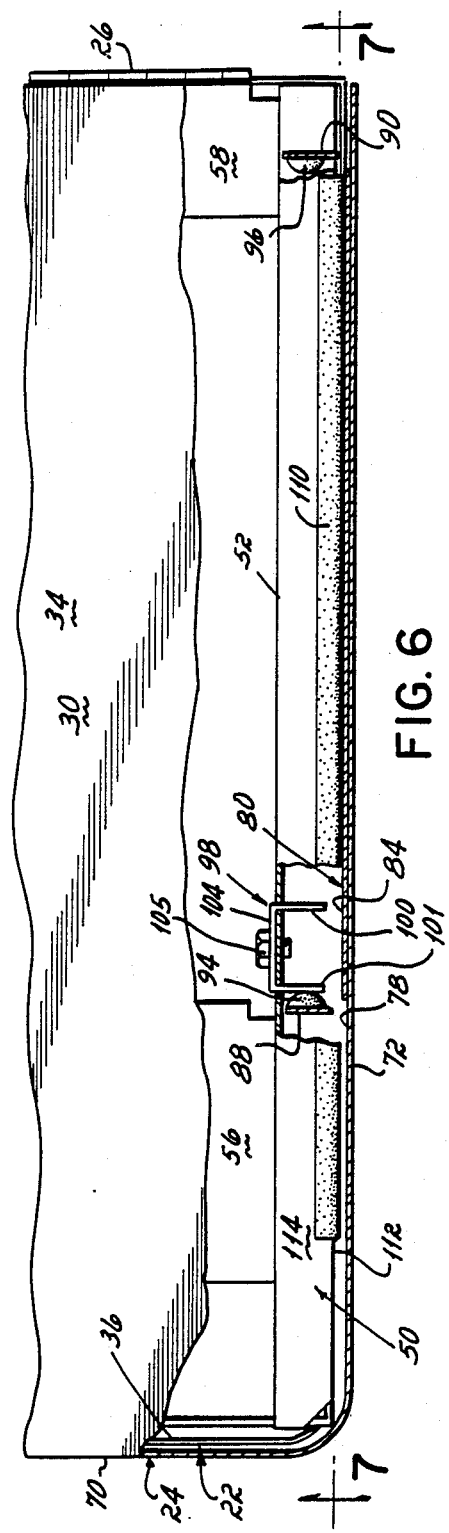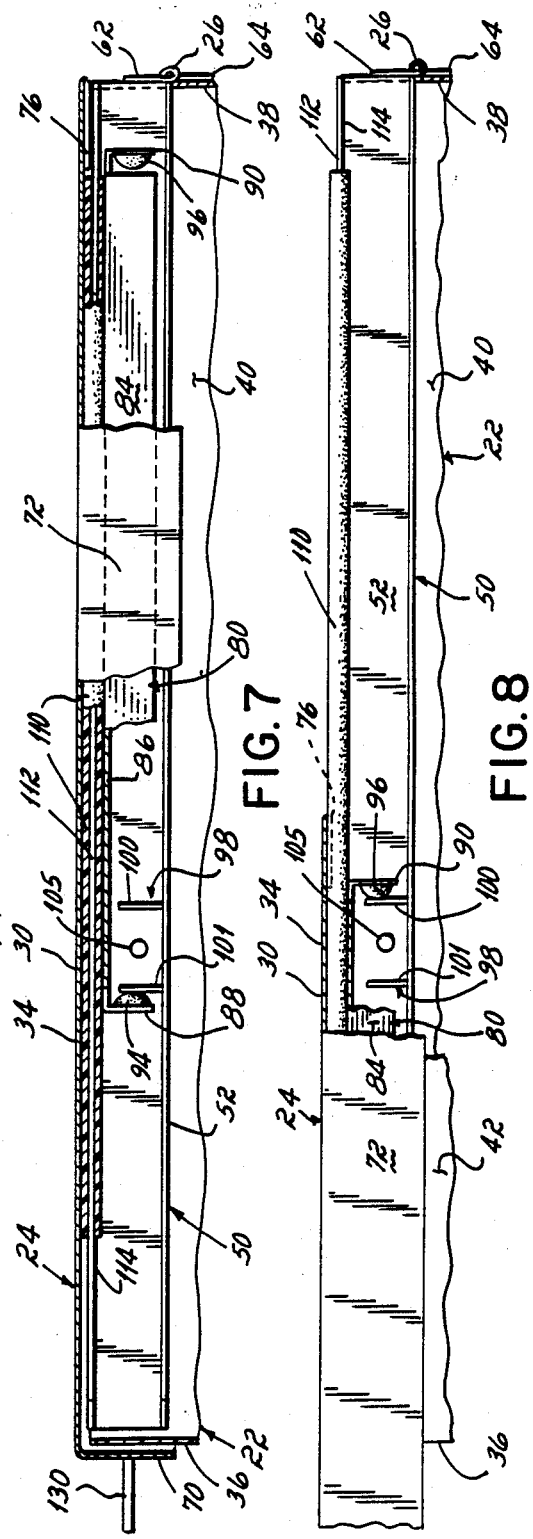

SECURITY FILE CABINET

This invention relates to security file cabinets and, more particularly, to a security file cabinet which is particularly suited to use in van-style vehicles.

BACKGROUND OF THE INVENTION

Many van-style vehicles are utilized as commercial vehicles for such purposes as delivery vans or portable work sites. When used in this fashion, there is often a need for a file cabinet to be located internally of the van for storing work orders, invoices, etc. There is also often a need for a miniature desk at which a driver or workman using that van may do the paperwork associated with the use of the van.

There have been vehicles which contained storage cabinets, but those cabinets have, for the most part, not been useful as file cabinets because of their size and shape. Those cabinets have also been inappropriate as desks or writing surfaces because of their size, contours and location. Examples of such vehicles containing storage cabinets may be found in Daniels U.S. Pat. No. 3,177,033; Daniels U.S. Pat. No. 3,022,107; Belsky U.S. Pat. No. 3,356,409; and Kathiria U.S. Pat. No. 4,453,759. But, the storage boxes disclosed in these patents, while suitable for storing objects, are not suitable as either filing cabinets or as desk writing surfaces.

Wynn U.S. Pat. No. 4,087,126 discloses a lockable security compartment mounted on the front console of a van-type vehicle, but the security compartment of this patent is again, because of its size, shape and location, not particularly appropriate as a file cabinet or as a desk writing surface.

SUMMARY OF THE INVENTION

It has therefore been one objective of this invention to provide a lockable security file for use in a van-style vehicle, which security file also functions as a convenient desk or writing surface. To that end, the invention of this application comprises an open-top file cabinet, the open top of which may be closed by a lid assembly. This lid assembly comprises a lid frame pivotally secured to the rear of the file cabinet and a lid cover slidably mounted upon the lid frame. In the use of this cabinet, the lid assembly may be lifted from the front end so as to pivot the lid assembly about a rear hinge and thereby expose the file contents contained internally of the file cabinet. Alternatively, the lid cover of the file cabinet may be slid forwardly on the cover frame to a position at which the flat top surface of the lid cover may function as a desk writing surface for a person seated in either the driver's or passenger's seat of the vehicle. When in the closed position with the lid cover at its rearwardmost position, the file cabinet may be locked so as to maintain the contents of the file cabinet secure while a workman or driver is away from the vehicle.

The primary advantage of this invention is that it provides a security file cabinet which does double duty, i.e., it functions both as a lockable file cabinet, but also as a desk writing surface located internally of a van-type vehicle and so positioned as to be usable by the driver of the vehicle without leaving the driver's seat.

These and other objects and advantages of this invention will be more readily apparent from the following description of the drawings in which:

FIG. 5 is a cross-sectional view taken on line 5—5 of FIG. 3.

FIG. 6 is a fragmentary top plan view, partially broken away, of a portion of the file cabinet of FIG. 2.

FIG. 7 is a cross-sectional view taken on line 7—7 of FIG. 6.

FIG. 8 is a view similar to FIG. 7, but illustrating the lid cover of the lid assembly in a forward position relative to the lid frame.

Figure 1:
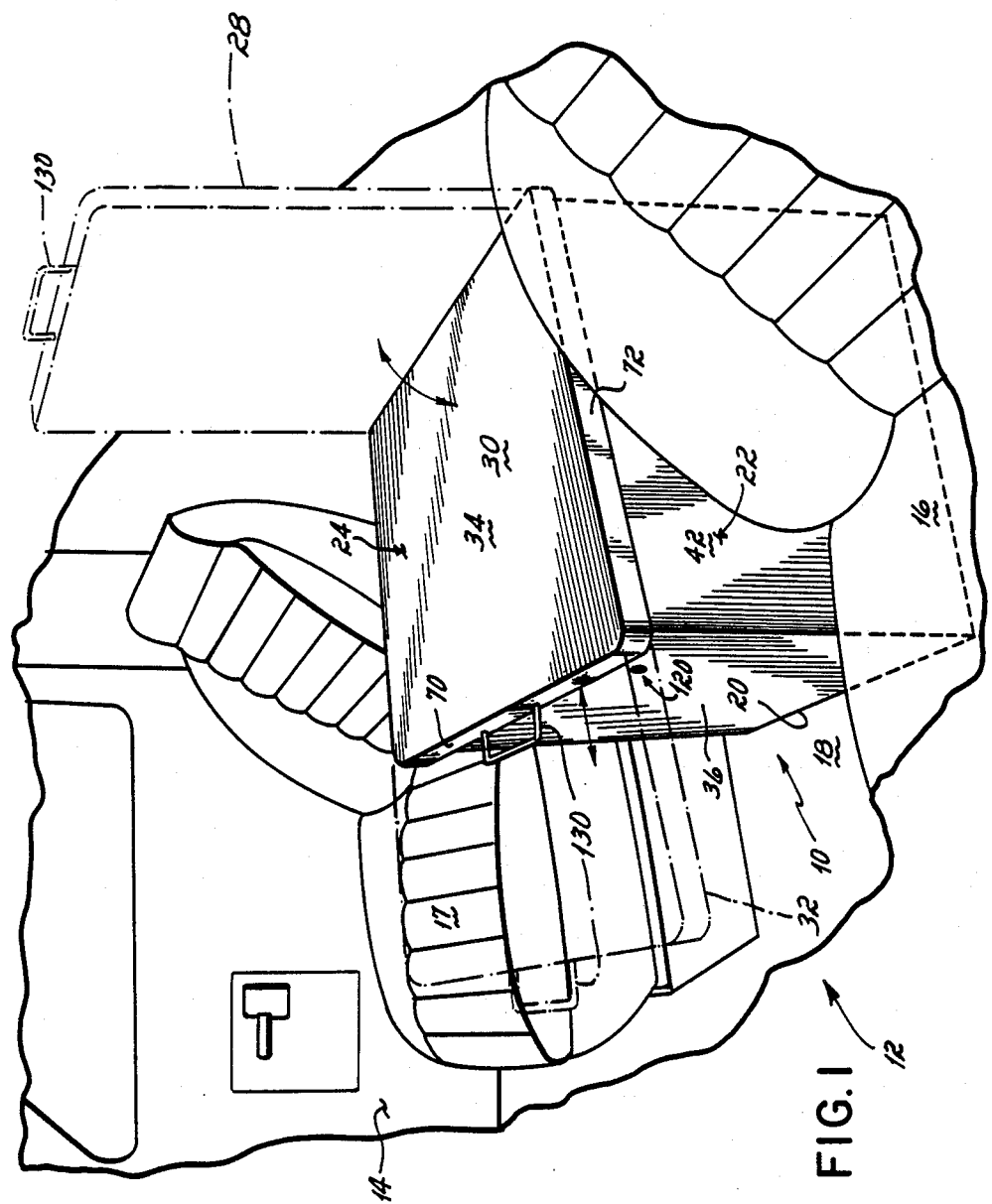
FIG. 1 is a perspective view of the driver and passenger compartment of a van-style vehicle having the security file cabinet of this invention located therein.

With reference first to FIG. 1, there is illustrated a security file 10 contained within the driver compartment 12 of a van-style vehicle 14. The van may be either a mini van or a full-size van, but in either event, it will contain a driver's seat 16 and possibly a passenger's seat 17. The security file 10 is located on the passenger's side of the driver's seat 16 and is fixedly secured to the floor 18 of the vehicle 14. The securement of the file to the floor 18 may be by bolts 19 (FIG. 4) which extend through the bottom wall 20 of the cabinet 22 of the security file 10 and through the floor of the vehicle.

Figure 2:
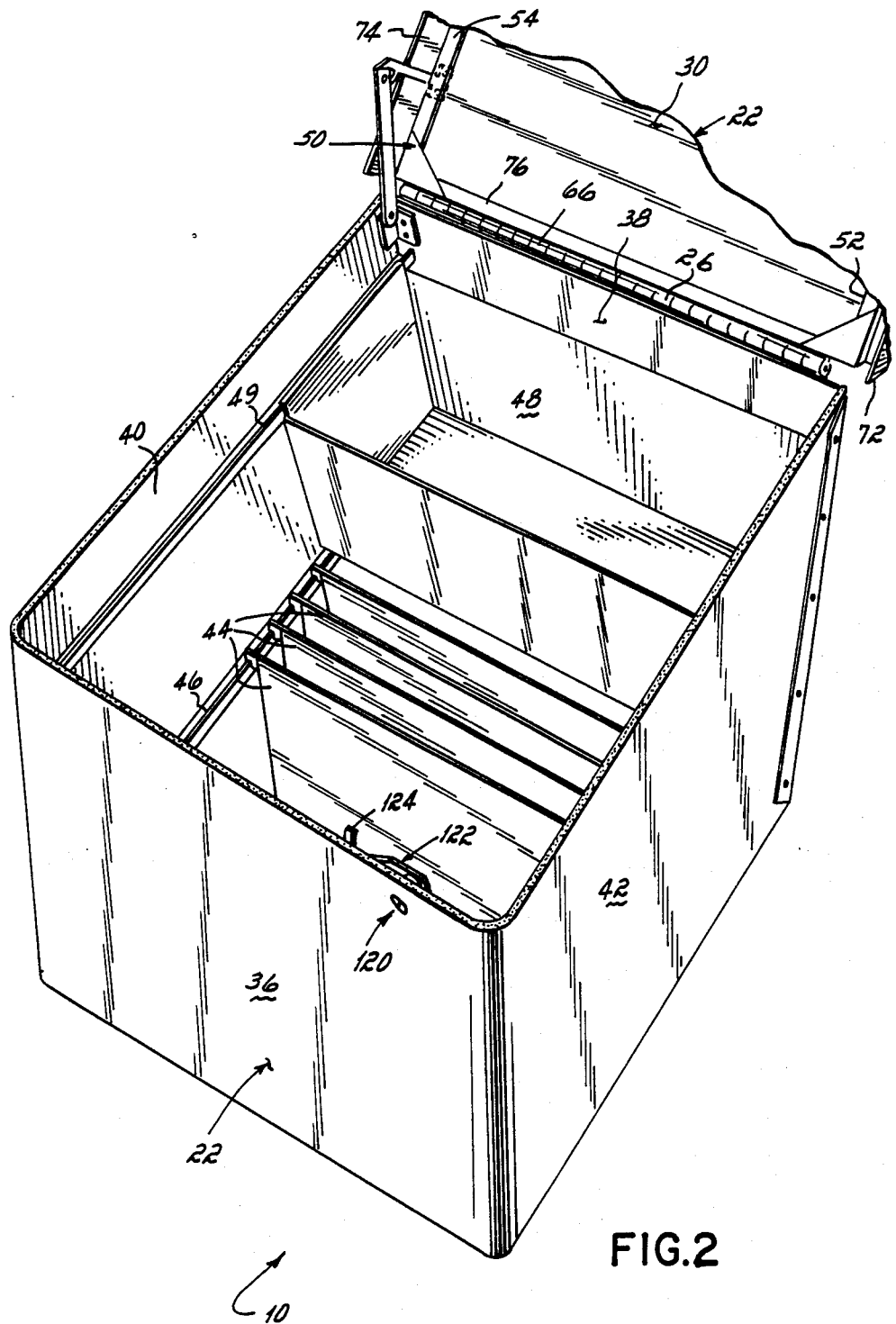
FIG. 2 is a perspective view of the file cabinet of FIG. 1, but illustrating the file cabinet with the lid assembly in an open position.
Figure 3:
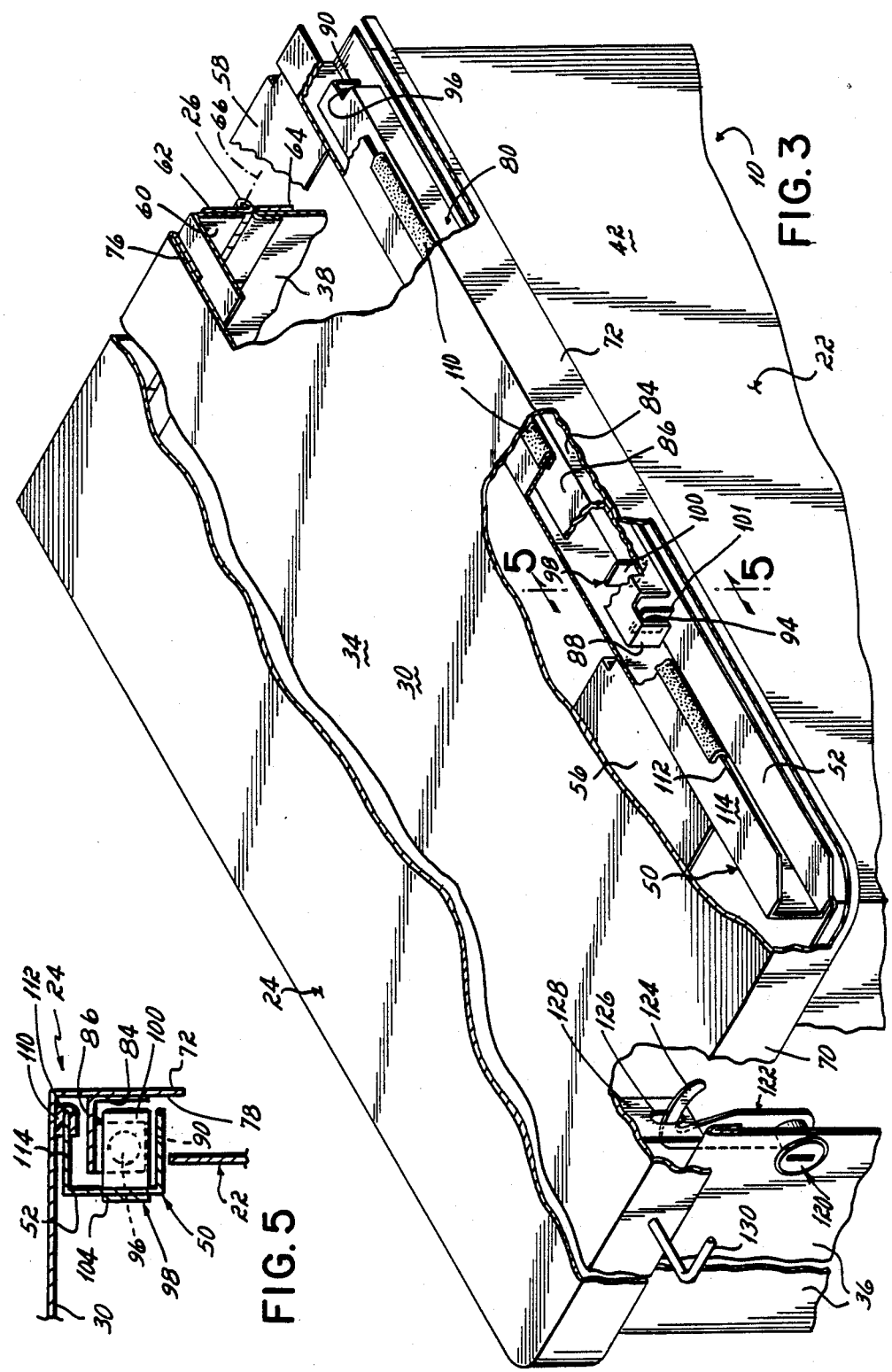
FIG. 3 is an enlarged perspective view, partially broken away, of the security file cabinet of FIG. 2.
Figure 4:
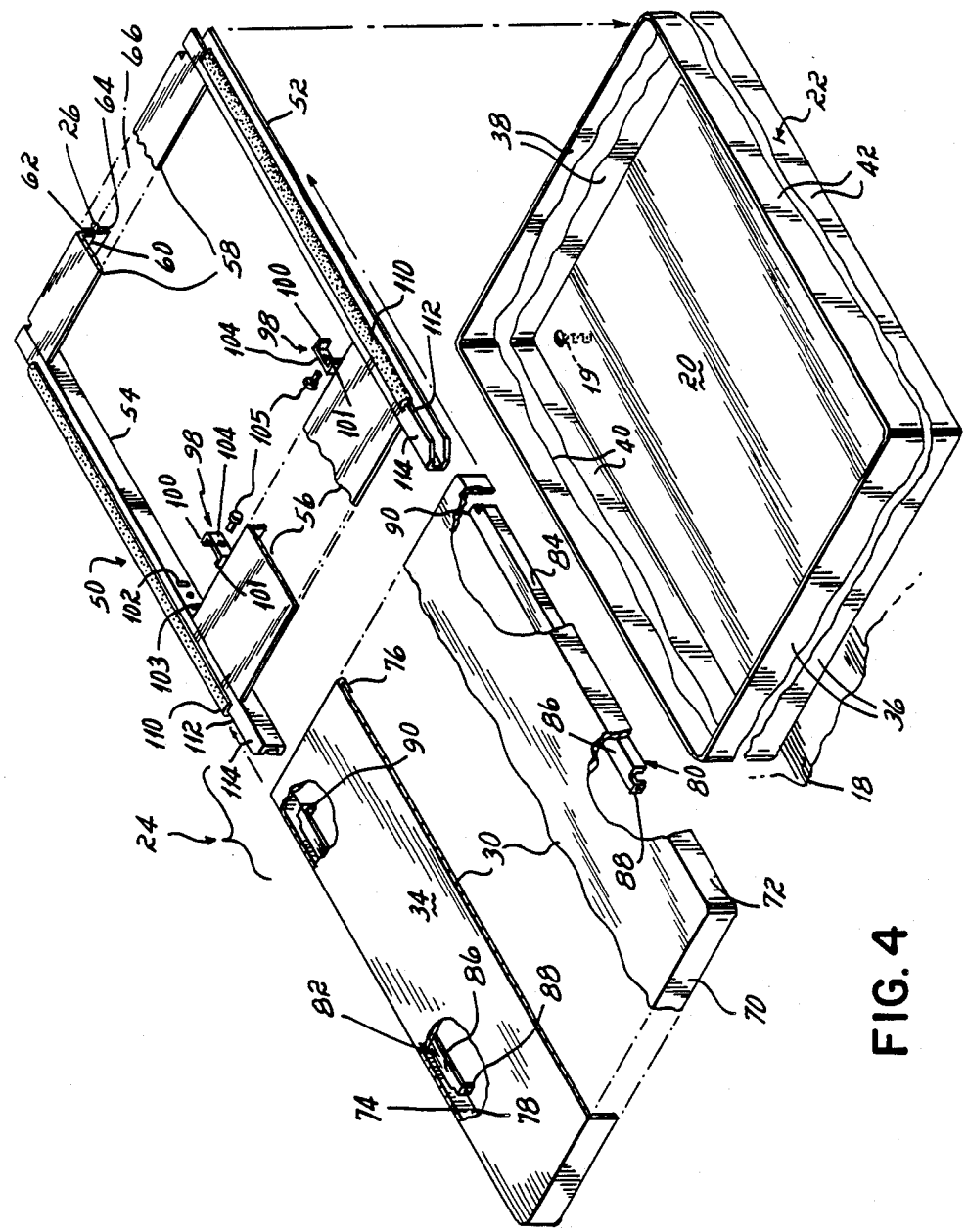
FIG. 4 is an exploded perspective view, partially broken away, of the security file of FIG. 2.

With reference now particularly to FIGS. 2, 3 and 4, it will be seen that the security file 10 comprises the security file cabinet 22 and a security file lid assembly 24. As best illustrated in FIG. 1, the security file lid assembly may be pivoted about a rear hinge 26 to an open position (illustrated by phantom lines 28 in FIG. 1), or the lid cover 30 of the lid assembly 24 may be slid forwardly (as illustrated by the phantom lines 32 of FIG. 1) to a position in which the flat top surface 34 of the lid cover 30 is spaced substantially forwardly of the front wall 36 of the file cabinet 22.

With reference particularly to FIGS. 2, 3 and 4, it will be seen that the file cabinet 22 comprises the bottom wall 20, front wall 36, rear wall 38 and sidewalls 40, 42. The bottom wall of the security file is secured to the floor 18 of the vehicle by bolts 19 or other conventional securements. At the top, the file cabinet is open such that the contents of the file are accessible through the open top of the cabinet. As best illustrated in FIG. 2, those contents may comprise conventional file dividers 44 movable along guide rails or rods 46 secured to the sides of the file and an open top container 48 similarly mounted from guide rails or rods 49 located along the sides of the file cabinet.

As best illustrated in FIG. 4, the lid assembly 24 comprises a lid frame 50 and the lid cover 30. The lid cover is slidable relative to the lid frame 50 as explained more fully hereinafter.

The lid frame 50 comprises a pair of outwardly facing U-shaped side channels 52, 54 interconnected by transversely extending spacer plates 56, 58. These plates 56, 58 are welded or otherwise fixedly secured at their opposite ends to the side channels 52, 54 so as to maintain the spacing of the longitudinally extending side channels.

With particular reference to FIGS. 3 and 4, it will be seen that the rearwardmost spacer plate 58 has a flange 60 extending downwardly from its rear edge. One side 62 of a conventional piano hinge 26 is secured to this downwardly extending flange 60. The opposite side 64 of the piano hinge is secured to the top edge of the rear wall 38 of the file cabinet. As a consequence of this hinged connection, the lid frame 50 is pivotably movable relative to the rear edge of the file cabinet about the transversely extending axis 66 of the hinge 26.

The lid cover 30 comprises the generally rectangular flat top plate 34 from which there depends on the front side a front flange or skirt 70 and along the sides side flanges or side skirts 72, 74. The rear edge of the flat top plate 34 of the lid cover 30, instead of terminating in a flange, terminates in a lip which is bent under and extends parallel to the underside of the flat top surface 34.

Welded or otherwise fixedly secured to the inside surface 78 of each of the side flanges 72, 74 there is a stop bracket 80, 82, respectively. Each of these stop brackets has a vertical sidewall 84 welded or otherwise affixed to the inside surface of the side flange 72, 74, and a horizontal top wall 86 which extends inwardly from the vertical sidewall 84. The top wall 86 is spaced downwardly from the underside of the flat top surface 34 of the lid cover 30. Extending downwardly from the opposite ends of the top wall 86 of each stop bracket 80, 82 there are depending tabs 88, 90, which tabs have adhered or otherwise attached to the inside surface thereof resilient stop buttons 94, 96. These stop buttons 94, 96 are engageable with a bumper bracket 98 of the lid frame to limit sliding movement of the lid cover 30 relative to the lid frame 50.

With reference particularly to FIGS. 4, 6, 7 and 8, it will be seen that the bumper bracket 98 is generally U-shaped and is mounted upon each of the side channels 52, 54 of the lid frame 50. Each of these U-shaped bumper brackets 98 has a pair of ends 100, 101 which extend through vertical slots 102, 103 of the side channels 52, 54. The interconnecting web 104 of each of these bumper brackets has a bore extending therethrough, which bore receives a threaded bolt 105 for securing the bumper bracket to the vertical wall of each of the lid frames 50 with the spaced legs 100, 101 of the bumper bracket extending into the open channel of the side channels 52, 54.

In the manufacture of the lid assembly, the lid cover 30 is slid onto the frame 50 with the stop brackets 80 passing through the open channels or grooves of the side channels 52. To facilitate sliding movement of the lid cover 30 over the frame 50, extruded plastic slip members 110, which are generally U-shaped in cross section, are fitted over the edge 112 of the top arm 114 of each side channel 52. The bottom of the flat top surface 34 of the lid cover then rests upon and slides over the top surfaces of these slip members 110.

In the assembly of the lid cover 30, the bumper brackets 98 are inserted through the apertures 110 of the side channels after the top cover 30 has been moved onto the lid frame 50. The bumper brackets 98 are then secured to the side channels by the screws 105. Thus, the legs 100, 101 of the bumper brackets are positioned in the lid assembly between the depending tabs 88, 90 of the stop bracket 80. So assembled, the bumper brackets 98 limit sliding movement of the lid cover 30 relative to the lid frame 50.

After mounting of the lid cover 30 on the lid frame 50 and placement of the bumper brackets in the assembled lid assembly 24, the lid assembly may be secured to the file cabinet 22 by attachment of the hinge plate 64 to the rear wall 38 of the file cabinet. Alternatively, the lid frame 50 may be attached to the file cabinet 22 before mounting of the lid cover on the lid frame 50. In that event, the lid cover is slid part way onto the lid frame to a position in which the rearwardmost depending tab 90 of each stop bracket 80 is located behind the slots 102, 103 of the side channels and the bumper brackets 98, then inserted into the slots 102, 103 and secured therein by the screws 105.

Mounted on the front wall 36 of the file cabinet 22 is a conventional key-operated lock mechanism 120. This mechanism controls movement of a keeper 122. The keeper has a hook-shaped end 124 formed on the end remote from the lock mechanism 120. This hook-shaped end 124 is movable into and out of a slot 126 of a lock bracket 128. The lock bracket 128 extends downwardly from the bottom of the flat top surface 34 of the lid cover 30 to which it is fixedly secured. When the hook-shaped end 124 of the keeper 122 is located within the slot 126 of the bracket 128, it prevents both sliding movement of the lid cover relative to the lid frame and pivoted opening movement of the lid assembly about the rear hinge 26 of the security file.

In the use of the security file, it is usually maintained in a locked condition within the passenger compartment of a van-style vehicle. In this condition of the file 10, documents contained internally of the file are secure. When a repairman or serviceman or other user of the vehicle wishes to access the file, all that is required is for him to use his key in the lock mechanism 120 to effect movement of the keeper 122 from the locked position illustrated in FIG. 3 to an unlocked position in which the hook-shaped end 124 of the keeper is disengaged from the lock brackets 128 of the lid cover 30. When unlocked, the lid assembly 24 may be lifted via a handle 130 on the front of the lid cover so as to cause the lid assembly to pivot from the solid position illustrated in FIG. 1 to the phantom line position in this same figure. In this open condition of the lid (illustrated in FIG. 2), the contents of the file 10 are fully accessible.

When the lid assembly is closed, as illustrated in FIGS. 1 and 3, and the lock keeper 122 of the lock mechanism 120 is disengaged from the lock bracket 128, the lid cover 30 is free to be moved forwardly from the position illustrated in solid lines in FIG. 1 to the position illustrated in phantom lines 32. In the forwardmost position of the lid cover relative to the lid frame, the lid cover may be conveniently used as a writing surface or desk top for a workman or serviceman seated in the driver's seat 16 of the van-style vehicle 12. In this forwardmost position of the lid cover relative to the lid frame, the contents of the rear of the file cabinet are exposed such that a hand may reach through the open rear portion of the top of the file cabinet to access materials contained internally of the rear portion of the file cabinet.

While I have described only a single preferred embodiment of my invention, persons skilled in this art will appreciate changes and modifications which may be made without departing from the spirit of my invention. Therefore, I do not intend to be limited except by the scope of the following appended claims:

I claim:

1. A van style vehicle body comprising a passenger compartment having a floor and at least one forward facing bucket-type seat mounted upon said floor, a security file cabinet mounted upon said floor adjacent on side of said seat, said security file comprising an open top file cabinet and a lid assembly, said file cabinet having a bottom wall and a sidewall, said bottom wall being fixedly secured to said floor of said vehicle body, guide rail means located internally of said file cabinet and supported from the sidewall thereof, a plurality of file dividers contained internally of aid file cabinet and movably supported from said guide rail means, said lid assembly having a flat top writing surface, means mounting said lid assembly upon said file cabinet for pivoted movement between an open position in which the open top of said container is uncovered and a closed position in which said flat top surface of said lid covers said open top of said file cabinet, and slidable support means for supporting said flat top surface of said lid assembly for horizontal sliding movement between a first position in which said flat top surface overlies said open top of said container and a second position in which at least a portion of said flat top surface of said lid assembly is located forwardly of said open top of said cabinet so as to facilitate use of said flat top surface as a flat writing surface for a person seated on said seat.

2. The vehicle of claim 1 in which said security file includes a lock for securing said lid assembly against pivoted opening movement and sliding movement relative to said open top of said container.

3. The vehicle body of claim 1 in which said flat top surface of said lid assembly overlies said open top of said cabinet in said first position of said lid assembly and exposes the rear portion of said open top of said cabinet in said second position.

4. The vehicle body of claim 1 in which said lid assembly comprises a lid frame and a lid cover, said top surface of said lid forming a portion of said lid cover, said lid frame being pivotally mounted on said lid cabinet and said lid cover being slidably mounted on said lid frame.

5. The vehicle body of claim 4 wherein said lid frame comprises a pair of side channels, each of said channels being U-shaped in cross section and being open toward the side of said frame, and means slidably supporting said lid cover from said side channels.

6. A van style vehicle body comprising a passenger compartment have a floor and at least forward facing bucket-type seat mounted upon said floor, a security file cabinet mounted upon said floor adjacent one side of said seat, said security file comprising an open top file cabinet and a lid assembly, said file cabinet having a bottom wall and a sidewall, said bottom wall being fixedly secured to said floor of said vehicle body, said lid assembly having a flat top surface, means mounting said lid assembly upon said file cabinet for pivoted movement between an open position in which the open top of said container is uncovered and a closed position in which said flat top surface of said lid covers said open top of said file cabinet, slidable support means for supporting said flat top surface of said lid assembly for horizontal sliding movement between a first position in which said flat top surface overlies said open top of said container and a second position in which at least a portion of said flat top surface of said lid assembly is located forwardly of said open top of said cabinet so as to facilitate use of said flat top surface as a flat writing surface for a person seated on said seat, said security file including a lock for securing said lid assembly against pivoted opening movement and sliding movement relative to said open top of said container, said flat top surface of said lid assembly overlying said open top of said cabinet in said first position of said lid assembly and exposing the rear portion of said open top of said second position, said lid assembly comprising a lid frame and a lid cover, said top surface of said lid forming a portion of said lid cover, said lid frame being pivotally mounted on said lid cabinet and said lid cover being slidably mounted on said lid frame, said lid frame comprising a pair of side channels, each of said channels being U-shaped in cross section and being open toward the side of said frame, means slidably supporting said lid cover from said side channels, and said lid cover having a front skirt and a pair of sidewall skirts extending downwardly from the front and side edges, respectively, of said flat top surface, said sidewall skirts having stop means extending inwardly from an inside surface thereof and movable within said side channels of said lid frame.

7. The vehicle body of claim 6 wherein said stop means comprises a stop bracket mounted on each of said sidewall skirts, each of said stop brackets having a pair of bumpers mounted upon the opposite ends thereof, and a bumper bracket secured to each of said U-shaped channels of said lid frame and extending into said channels so as to be engageable with said bumper of said stop brackets so as to limit sliding movement of said lid cover relative to said bed frame.

8. The vehicle body of claim 7 which further includes a lock for securing said lid assembly, including said lid cover, from movement relative to said file cabinet, said lock including a lock bracket depending from said lid cover inside of said front wall of said skirt and a key actuated keeper mounted on said file cabinet and selectively engageable with said lock bracket to secure said lock cover against movement relative to said file cabinet.

9. A security file cabinet for mounting upon a mounting surface of a vehicle, said security file comprising an open top file cabinet and a lid assembly, said file cabinet having a bottom wall and a sidewall, said bottom wall being fixedly secured to said mounting surface of said vehicle when said security file is in use in a vehicle, guide rail means located internally of said file cabinet and supported from the sidewall thereof, a plurality of file dividers contained internally of said file cabinet and movably supported from said guide rail means, said lid assembly having a flat top writing surface, means mounting said lid assembly upon said file cabinet for pivoted movement between an open position in which the open top of said container is uncovered and a closed position in which said flat top surface of said lid covers said open top of said file cabinet, and slidable support means for supporting said flat top surface of said lid assembly for horizontal sliding movement between a first position in which said flat top surface overlies said open top of said container and a second position in which at least a portion of said flat top surface of said lid assembly is located forwardly of said open top of said cabinet.

10. The security file cabinet of claim 9 in which said security file includes a lock for securing said lid assembly against pivoted opening movement and sliding movement relative to said open top of said container.

11. The security file cabinet of claim 9 in which said flat top surface of said lid assembly overlies said open top of said cabinet in said first position of said lid assembly and exposes the rear portion of said open top of said cabinet in said second position.

12. The security file cabinet of claim 9 in which said lid assembly comprises a lid frame and a lid cover, said top surface of said lid forming a portion of said lid cover, said lid frame being pivotally mounted on said lid cabinet and said lid cover being slidably mounted on said lid frame.

13. The security file cabinet of claim 12 wherein said lid frame comprises a pair of side channels, each of said channels being U-shaped in cross section and being open toward the side of said frame, and
means slidably supporting said lid cover from said side channels.

14. A security file cabinet for mounting upon a mounting surface of a vehicle, said security file comprising an open top file cabinet and a lid assembly, said file cabinet having a bottom wall and a sidewall, said bottom wall being secured to said mounting surface of said vehicle when said security file is in use in a vehicle,
said lid assembly having a flat top surface, means mounting said lid assembly upon said file cabinet for pivoted movement between an open position in which the open top of said container is uncovered and a closed position in which said flat top surface of said lid covers said open top of said file cabinet,
slid able support means for supporting said flat top surface of said lid assembly for horizontal sliding movement between a first position in which said flat top surface overlies said open top of said container and a second position in which at least a portion of said flat top surface of said lid assembly is located forwardly of said open top of said cabinet,
said security file including a lock for securing said lid assembly against pivoted opening movement and sliding movement relative to said open top of said container,
said flat top surface of said lid assembly overlying said open top of said cabinet in said first position of said lid assembly and exposes the rear portion of said open top of said cabinet in said second position,
said lid assembly comprising a lid frame and a lid cover, said top surface of said lid forming a portion of said lid cover, said lid frame being pivotally mounted on said lid cabinet and said lid cover being slidably mounted on said lid frame,
said lid frame comprising a pair of side channels, each of said channels being U-shaped in cross section and being open toward the side of said frame,
means slidably supporting said side cover from said side channels, and
said lid cover having a front skirt and a pair of sidewall skirts extending downwardly from the front and side edges, respectively, of said flat top surface, said sidewall skirts having stop means extending inwardly from an inside surface thereof and movable within said side channels of said lid frame.

15. The security file cabinet of claim 14 wherein said stop means comprises a stop bracket mounted on each of said sidewall skirts, each of said stop brackets having a pair of bumpers mounted upon the opposite ends thereof, and a bumper bracket secured to each of said U-shaped channels of said lid frame and extending into said channels so as to be engageable with said bumper of said stop brackets so as to limit sliding movement of said lid cover relative to said bed frame.

16. The security file cabinet of claim 15 which further includes a lock for securing said lid assembly, including said lid cover, from movement relative to said file cabinet, said lock including a lock bracket depending from said lid cover inside of said front wall of said skirt and a key actuated keeper mounted on said file cabinet and selectively engageable with said lock bracket to secure said lock cover against movement relative to said file cabinet.

* * * * *

UNITED STATES PATENT AND TRADEMARK OFFICE
CERTIFICATE OF CORRECTION

PATENT NO. : 4,986,589

DATED : January 22, 1991

INVENTOR(S) : Donald W. McNew

It is certified that error appears in the above-identified patent and that said Letters Patent is hereby corrected as shown below:

Col. 5, line 7, change "aid" to read as --said--.

Col. 5, line 48, change "have" to read as --having--.

Col. 7, line 37, change "slid able" to read as --slidable--.

Signed and Sealed this

Fifteenth Day of September, 1992

Attest:

DOUGLAS B. COMER

Attesting Officer

Acting Commissioner of Patents and Trademarks